United States Patent [19]

Ando

[11] Patent Number: 4,689,781
[45] Date of Patent: Aug. 25, 1987

[54] OPTICAL SYSTEM FOR TRACING INFORMATION RECORDING MEDIUM WITH MULTIPLE BEAMS

[75] Inventor: Hideo Ando, Hino, Japan

[73] Assignee: Kabushiki Kaisha Toshiba, Kawasaki, Japan

[21] Appl. No.: 705,305

[22] Filed: Feb. 25, 1985

[30] Foreign Application Priority Data

Feb. 29, 1984 [JP] Japan .................. 59-37528
Feb. 29, 1984 [JP] Japan .................. 59-37531

[51] Int. Cl.$^4$ .............................. G11B 7/135
[52] U.S. Cl. ........................ 369/112; 369/46
[58] Field of Search ............ 369/46, 112, 110, 44, 369/45, 109, 121, 122; 350/171, 173

[56] References Cited

U.S. PATENT DOCUMENTS

| | | | |
|---|---|---|---|
| 3,876,841 | 4/1975 | Kramer et al. | 369/46 |
| 3,922,069 | 11/1975 | Kishikawa et al. | 350/173 |
| 3,992,575 | 11/1976 | Velzel et al. | 369/112 |
| 4,411,492 | 10/1983 | Bluege | 350/173 |
| 4,502,757 | 3/1985 | Maeda | 350/173 |
| 4,513,408 | 4/1985 | Nomura et al. | 369/46 |
| 4,545,651 | 10/1985 | Kato et al. | 369/112 |

FOREIGN PATENT DOCUMENTS 3227654 4/1983 Fed. Rep. of Germany .

Primary Examiner—Donald McElheny, Jr.
Attorney, Agent, or Firm—Cushman, Darby & Cushman

[57] ABSTRACT

In an optical system for tracing an optical disk with multiple laser beams, a light beam emitted from a semiconductor laser is collimated by a collimator lens and then is incident on a light reflecting element. The element has a first surface, a first coating layer coated on the first surface, a second surface and a second coating layer coated on the second surface. A first light beam component reflected from the first surface proceeds straight along the optical axis. A second light beam component which passes through the element and is reflected from the second surface proceeds straight in a direction at a slight angle to the optical axis. The first and second light beam components are incident on an objective lens in different directions, and first and second beam spots are formed on a recording layer on the optical disk.

23 Claims, 16 Drawing Figures

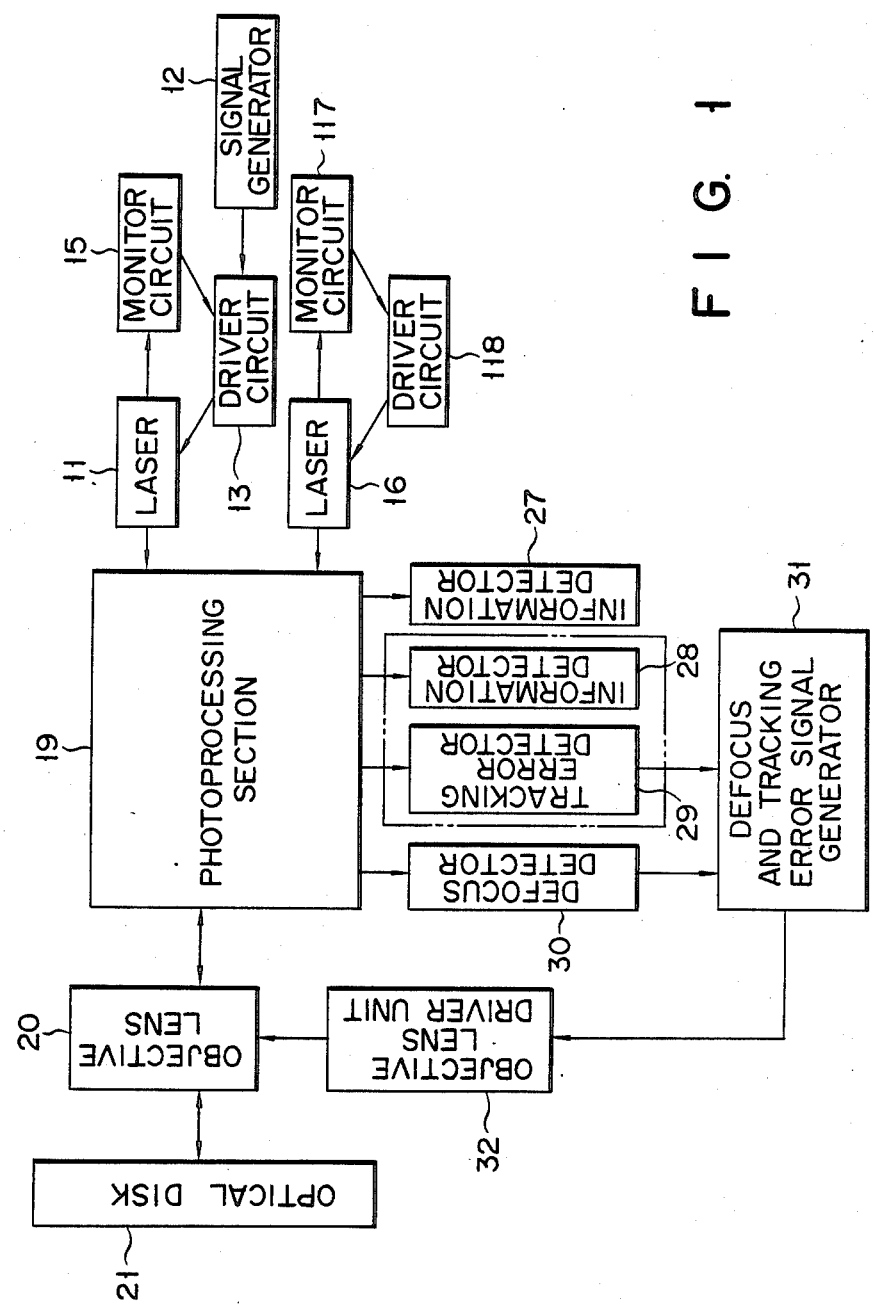
F I G. 1

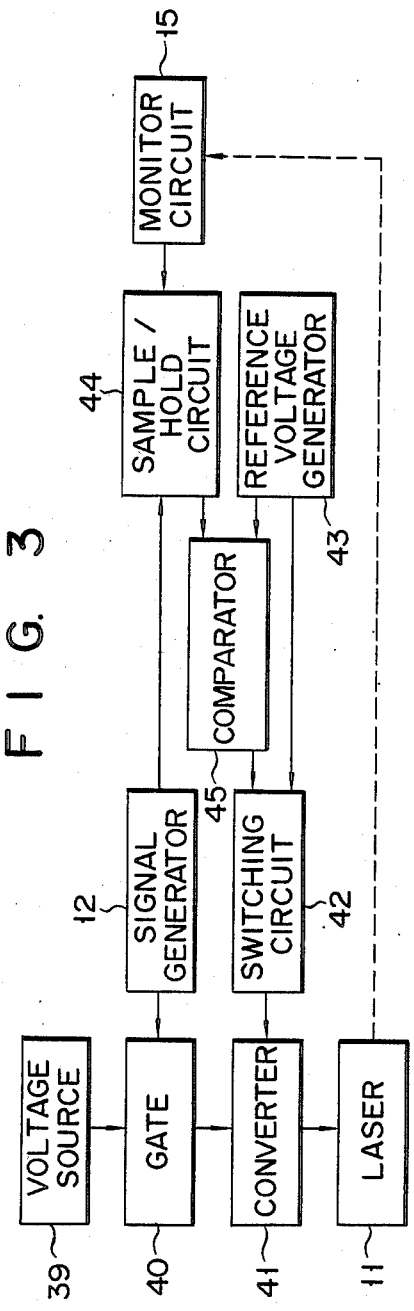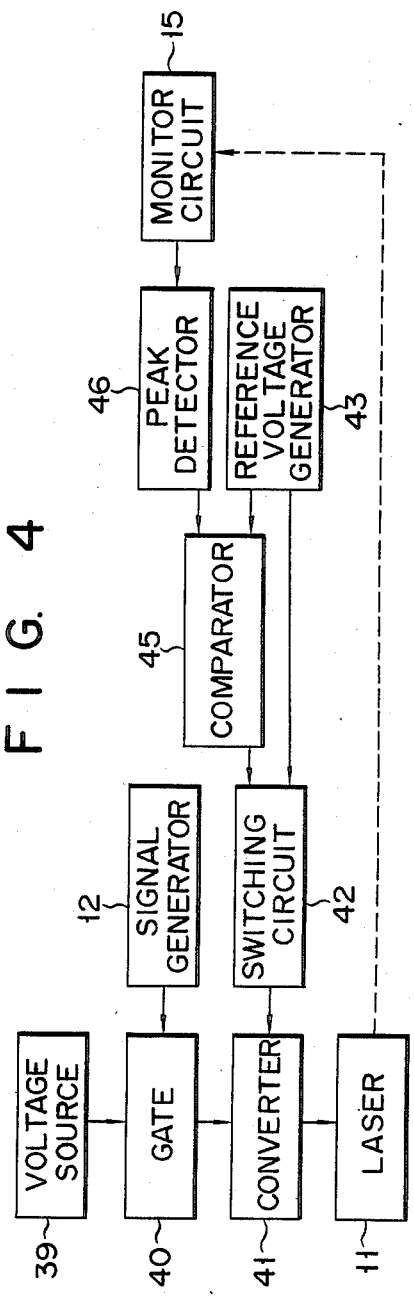

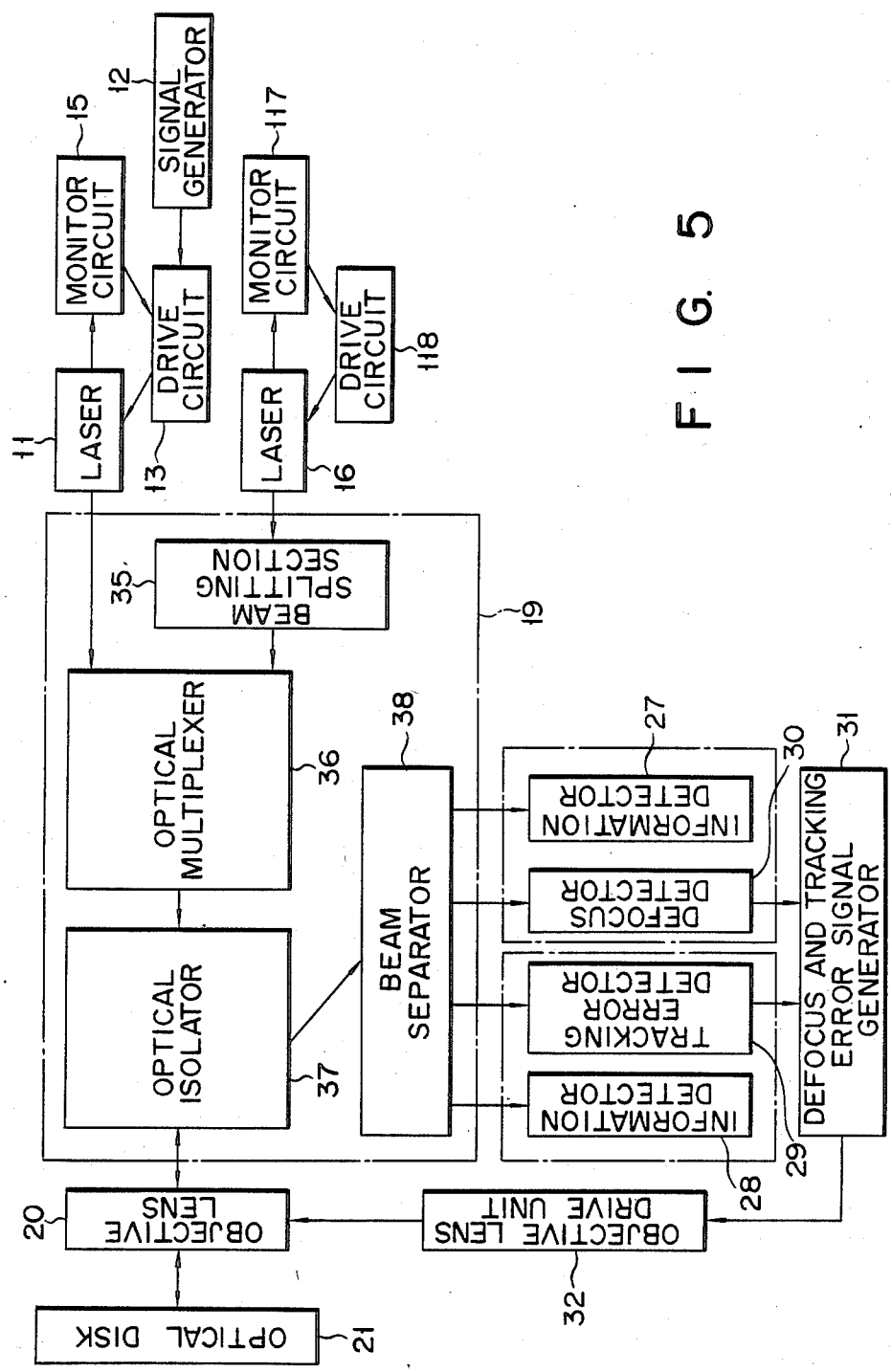
F I G. 5

OPTICAL SYSTEM FOR TRACING INFORMATION RECORDING MEDIUM WITH MULTIPLE BEAMS

BACKGROUND OF THE INVENTION

The invention relates to an optical system for tracing an information recording medium such as an optical disk for recording and reproduction or recording, reproduction and erasing of information with multiple beams and, more particularly, to an optical system which splits a single light beam into a plurality of light beams.

Recently, various optical heads for recording and reproducing information on and from optical disks have been developed and used in various ways. In such an optical head, a laser beam which is light intensity modulated according to information to be recorded is focused by an objective lens onto a rotating recording surface of the optical disk to cause a continuous change in the state of the recording surface, e.g., form pits or like holes or change an optical characteristic such as the light reference or reflectivity of the disk, whereby information is recorded on the recording surface. Also, when a reproduction laser beam is focused by the objective lens onto the recording surface, it is light intensity modulated by the areas of the continuously changed state. Information is read out as the reproduction light beam is converted by an optical detector into an electric signal.

An optical disk which has a tracking guide for specifying an area, in which information is to be recorded, is well known in the art. An optical head, which records information on an optical disk while confirming that the information is being accurately recorded on the tracking guide, is also know. In such an optical head, in which a reproduction beam is focused on the optical disk not only during reproduction but also during recording, an area that has been traced by a recording beam is also traced by a reproduction light beam. Therefore, it may be impossible to prevent the possible departure of a recording light beam from a predetermined tracking guide. Therefore, it may be impossible to prevent damage that may be caused to an area other than the recording area by the recording light beam. Further, there may be defective areas in the tracking guide, which cannot be detected, so that it is possible to record information in the defective areas.

In order to solve the above problems, optical heads have been proposed in which a prebeam or guide beam is converged onto an optical disk in addition to a recording/reproduction light beam and the area that has been traced by the recording and reproduction light beam, as disclosed in U.S. application Ser. No. 673,764 filed Nov. 21, 1984 and corresponding EPC application No. 84114044,5 filed Nov. 20, 1984. In such optical heads, it is required that a plurality of light beams be incident on the optical disk at slightly different incidence angles. No optical system which can meet such a requirement, however, has yet been proposed.

SUMMARY OF THE INVENTION

An object of the invention is to provide an optical system for focusing multiple beams onto an information medium, which can produce a plurality of light beams incident on an information recording medium at slightly different incidence angles.

According to the invention, there is provided an optical system for tracing an information recording medium with multiple beams comprising:

a light source having a single light emitting point, for generating a single light beam from the single beam light beam emitting point;

means for splitting said light beam into two or more light beams and directing the split light beams in slightly different directions; and an objective lens for converging a light beam toward a recording surface capable of recording and reproduction;

BRIEF DESCRIPTION OF THE DRAWINGS

FIG. 1 is a block diagram schematically showing an optical head according to the invention;

FIG. 3 is a block diagram showing a recording laser drive circuit shown in FIG. 1;

FIG. 4 is a block diagram showing a modification of the recording laser drive circuit shown in FIG. 3;

FIG. 5 is a block diagram showing in detail an optical head shown in FIG. 1;

DETAILED DESCRIPTION OF THE PREFERRED EMBODIMENT

Figure 2:
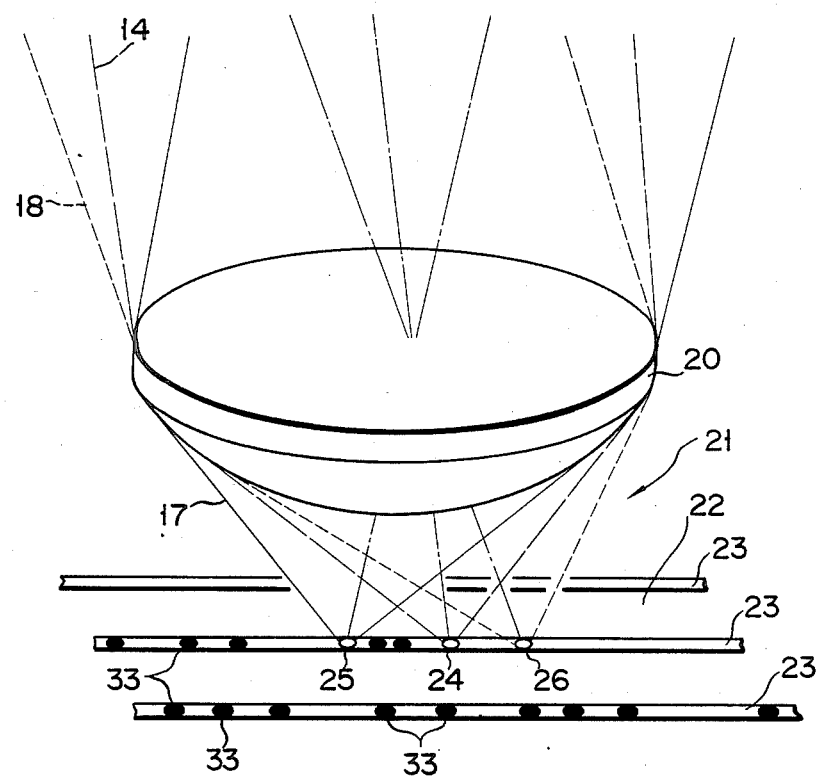
FIG. 2 is a perspective view showing the orbit of the laser beam in an objective lens system shown in FIG. 1.

FIG. 1 is a block diagram of an optical head according to an embodiment of the present invention. In this optical head, a recording laser, e.g., a semiconductor laser 11, is driven by a recording laser driver circuit 13 in response to a recording signal from a recording signal generator 12 in the recording mode. A laser beam from the recording laser 11 is intensity-modulated in response to the recording signal. The modulated recording laser beam is supplied to a photoprocessing section 19 for multiplexing a plurality of light beams and separating the multiplexed light beams. The recording laser 11 also generates a monitor laser beam in addition to the recording laser beam. The monitor laser beam is converted by a monitor circuit 15 to an electrical signal. This electrical signal is fed back as a feedback signal to the recording laser drive circuit 13. Therefore, recording laser 11 generates an intensity-modulated recording laser beam having a given intensity level.

The photoprocessing section 19 receives a another laser beam of the given constant level generated from a reproduction and guide laser, e.g., a semiconductor laser 16 which is operated by a reproduction and guide laser driver circuit 118 in both the reproduction and recording modes. The laser beam emitted from the laser 16 is split into reproduction and guide laser beams in the photoprocessing section 19. The laser 16 also generates the monitor laser beam in addition to the reproduction and guide laser beams. The monitor laser beam is converted to an electrical signal by a reproduction and guide monitor circuit 117. This electrical signal is fed back as a feedback signal to the laser driver circuit 118. Therefore, the reproduction and guide laser 16 generates the beam having a given constant intensity level.

The recording, reproduction and guide beams are multiplexed by the photoprocessing section 19 in the recording mode. The reproduction and guide laser beams are multiplexed by the photoprocessing section 19 in the reproduction mode. The multiplexed laser beams in the recording and reproduction modes are transmitted through a single optical path and are incident on the objective lens 20. As shown in FIG. 2, the multiplexed laser beam is focused by the objective lens 20 to form a beam spot on the light-reflecting surface (i.e., a recording surface 22) of the optical disk 21 which is subjected to recording/reproduction. In the recording mode, when the objective lens is held in the in-focus state, recording, reproduction and guide spots 24, 25 and 26 corresponding to the recording, reproduction and guide laser beams are formed on a tracking guide 23 on the recording surface 22 at short intervals. In the reproduction mode, when the objective lens is held in the in-focus state, reproduction and guide beam spots 25 and 26 corresponding to the reproduction and guide laser beams are formed on the tracking guide 23 on the recording surface 22 at a short interval. When the optical disk 21 is rotated, the respective areas on the tracking guide 23 are sequentially traced in an order of the guide beam spot 26, the recording beam spot 24 and the reproduction beam spot 25. When the intensity of the recording laser beam exceeds a predetermined level, a characteristic change (e.g., formation of a pit or change of the optical characteristics such as a reference index or a reflectance) occurs in the recording surface area on which the recording beam spot is formed. In this manner, the pit is formed on the recording surface in accordance with recording information, or the optical characteristics of the recording surface change. When the reproduction laser beam of a given constant level irradiates the recording surface 22, and the reproduction beam spot 25 traces the tracking guide 23, the reproduction beam is intensity-modulated in the area where the pit is formed or the optical characteristics such as a refractive index or reflectance change. When the guide beam spot reaches an area where supplementary information concerning track address and sector address is recorded as pits 33, the guide laser beam is intensity-modulated.

The laser beam reflected by the recording surface 22 passes through the objective lens 20 and is incident on the photoprocessing section 19. The laser beam is separated by the photoprocessing section 19 into the recording laser beam, the reproduction laser beam and the guide laser beam. The recording laser beam is attenuated or shielded. The reproduction laser beam is converted to an electrical signal. This electrical signal is supplied to an information detector 28 for reproducing information recorded in the recording surface 22 of the optical disk 21, a defocusing detector 30 for detecting a defocused state of the objective lens 20, and a photodetector in a tracking error detector 29 for detecting whether the laser beam properly traces the tracking guide 23. The guide laser beam is also incident on a photodetector of a supplementary information detector 27 for reproducing supplementary information (concerning the track address and the sector address) recorded on the recording surface 22 of the optical disk 21. Signals from the defocus detector 30 and the tracking error detector 29 are supplied to a defocus and tracking error signal generator 31 to convert into a defocus signal and a tracking error signal which are supplied to an objective lens driver unit 32. The objective lens driver unit 32 moves the objective lens 20 along the optical axis thereof and moves the objective lens 20 in a direction perpendicular to the tracking guide. The objective lens 20 is thus maintained in the in-focus state and is oriented in a direction so as to cause the laser beam to properly trace the tracking guide.

The recording laser driver 13 has the detailed arrangement shown in FIG. 3. The recording laser 11 is connected to a constant voltage source 39 through a gate 40 and a current/voltage converter 41. The current/voltage converter 41 is connected to a switching circuit 42. The switching circuit 42 is operated to connect a reference voltage generator 43 to the current-/voltage converter 41 when the recording laser 13 is driven. The current/voltage converter 41 is operated by a reference voltage applied from the reference voltage generator 43 when the recording laser driver circuit 13 is driven. The gate 40 is connected to the recording signal generator 12 and is enabled/disabled in response to the recording signal generated therefrom. A light intensity modulating voltage is converted by the current/voltage converter 41 to a current signal. The current signal is supplied to the recording laser 11. The recording laser 11 generates a laser beam in accordance with the recording signal. The switching circuit 42 is operated to connect the current/voltage converter 41 to a comparator 45 after the recording laser drive circuit 13 is started. The recording signal generator 12 is also connected to a sample/hold circuit 44. The sample/hold circuit 44 is connected to a monitor circuit 15 for monitoring the laser beam generated from the recording laser 11. Therefore, every time the ON signal is generated from the recording signal generator 12, a monitor output from the monitor circuit 15 is sampled by the sample/hold circuit 44. In other words, every time the laser beam is generated from the recording laser 11, the light intensity is sampled. The sample output is compared by the comparator 45 with the reference voltage from the reference voltage generator 43. A comparison result is supplied to the current/voltage converter 41 through the switching circuit 42. The current flowing from the current/voltage converter 41 to the recording laser 11 is adjusted such that the output laser beam from the recording laser 11 is constant. As shown in FIG. 4, a peak detector may be used in place of the sample/hold circuit 44 of FIG. 3. In this case, a peak of the monitor output from the monitor circuit 15 may be sampled by the peak detector 46.

Figure 6:
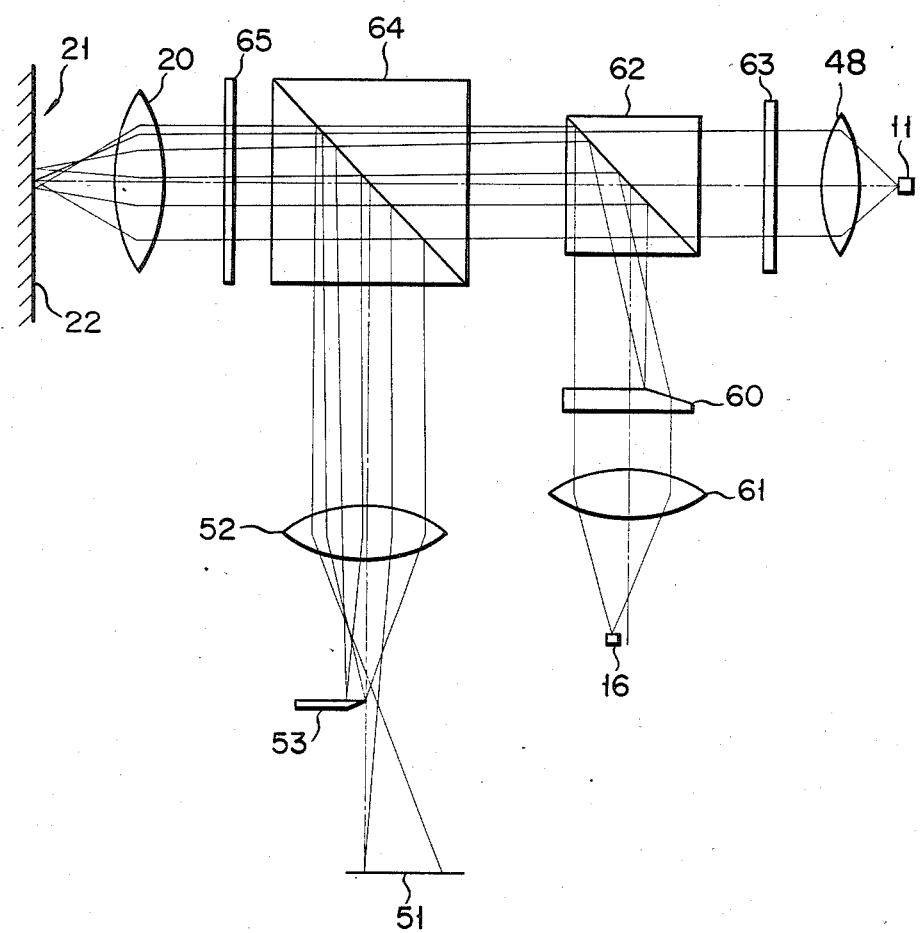
FIG. 6 is a schematic view showing an optical system of the optical head shown in FIG. 6.

As shown in FIG. 5, the photoprocessing section 19 comprises a beam splitting section 35 an optical multiplexer 36 for multiplexing a plurality of laser beams, an optical isolator 37 for preventing the laser beam from returning to the lasers 15 and 16, and a laser beam separator 38 for separating the multiplexed laser beams. More specifically, as shown in FIG. 6, the beam splitting section 35 comprises an optical refractor such as a prism 60 and a collimator lens 61, and the optical multiplexer 3 comprises a dichroic prism 62 and a filter 63. The optical isolator 37 comprises a polarizing beam splitter 64 and a λ/4 plate 65, and the laser beam separator 38 comprises knife edge 53. In an optical system shown in FIG. 6, the single laser beam emitted from the laser 16, is collimated by the collimator lens 62 and is refracted by the prism 61 so that the single laser is separated into the reproduction and guide laser beams. The separated light beams are incident on the dichroic prism 62. The reproduction and guide laser beams have a wavelength of 780 nm. These laser beams are reflected by the dichroic prism 62 and are incident on the polarizing beam splitter 64. The recording laser beam emitted from the recording laser 11 is collimated by a collimator lens 48 in the same manner as described above. A collimated recording laser beam is thus incident on the dichroic prism 62. The recording laser beam has a wavelength of 830 nm so that the recording laser beam passes through the dichroic prism 62 and is incident on the polarizing beam splitter 64 through the same optical path as the reproduction and guide laser beams. The recording, reproduction and guide laser beams generated from the polarizing beam splitter 64 are incident on the objective lens 20 through the λ/4 plate 65 and are focused by the objective lens 20 to form the corresponding recording, reproduction and guide beam spots 24, 25 and 26 on the recording surface 22. The laser beams reflected from the recording surface 22 are incident on the polarizing beam splitter 64 through the objective lens 20 and the λ/4 plate 65. When the laser beam reciprocates through the λ/4 plate 65, the plane of polarization of the laser beam is rotated through 90 degrees. As a result, the laser beam is reflected by the polarizing beam splitter 64. The recording, reproduction and guide laser beams reflected by the polarizing beam splitter 64 are focused by a projection lens 52 and are separated by the knife edge 53 into the recording, reproduction and guide laser beams. The recording laser beam is attenuated, reflected or shielded by the knife edge 53. The reproduction laser beam is incident on the information detector 28, and on the defocus detector 30 and the photodetector 51 of the tracking error detector 29. The guide laser beam is incident on the photodetector 54 of the supplementary information detector 27.

Figure 7:
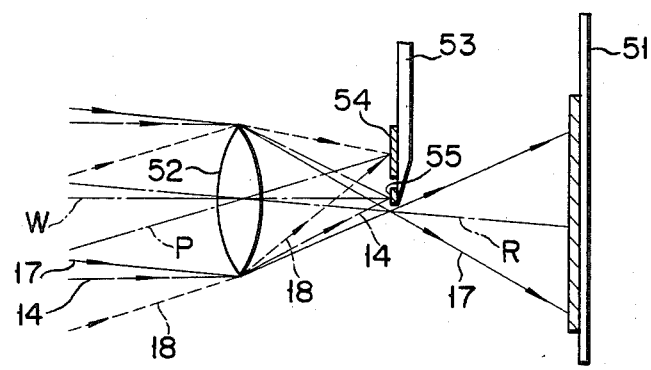
FIGS. 7 and 8 are a side view and a perspective view showing an optical system for separating a multiplex laser beam into a recording laser beam, a reproduction laser beam and a guide laser beam.
Figure 8:
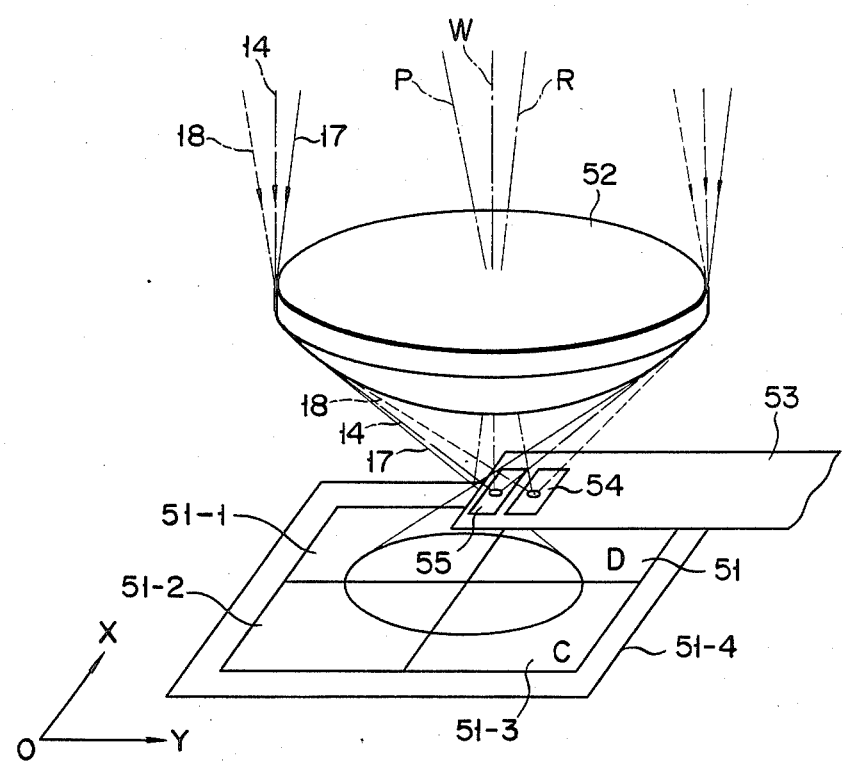

An optical system for separating the multiplexed laser beam into the recording, reproduction and guide laser beams will be described in detail with reference to FIGS. 7 and 8. In the arrangement shown in FIGS. 7 and 8, the knife edge 53 or the light-shielding plate 53 is located in beam waists of the recording, reproduction and guide laser beams which are determined by the projection lens 52 in the in-focus state. The beam waists of the recording and guide beams are formed on the knife edge or the light-shielding plate 53. More specifically, the knife edge is inserted from the Y direction and extends along the X direction in such a manner that the edge is aligned with the optical axis of the projection lens 52. The Y direction is defined as a direction along which an image of the tracking guide of the optical disk extends when it is projected to the photodetector 51 by an optical system arranged between the recording surface 22 (i.e., the light-reflecting surface) of the optical disk 21 and the photodetector 51. The X direction is defined as a direction perpendicular to the Y direction. As previously described, the recording, reproduction and guide laser beams are focused to form the beam spots 24, 25 and 26 on the tracking guide 23 of the recording surface 22 at very short intervals when the objective lens is held in the in-focus state. A recording laser beam 14, a reproduction laser beam 17 and a guide laser beam 18, which are reflected by the areas having the beam spots 24, 25 and 26 and are transmitted to the projection lens 52 through the objective lens 20, are not parallel to main light beams W, R and P but are inclined with respect thereto, as shown in FIGS. 7 and 8, respectively. Therefore, beam waists are formed at different positions on the focal surface of the projection lens 52. Since the knife edge or light-shielding plate 53 is positioned such that the recording and guide beams spots are formed on the knife edge or light-shielding plate 53, only the reproduction laser beam 17 is incident on the defocus detector 30, the information detector 28, and the photodetector 51 of the tracking error detector 29. Therefore, the photodetector 47 detects the recording signal representing information, the defocus signal representing the defocused state, and the tracking signal representing a tracking error.

In the arrangement shown in FIGS. 7 and 8, a nondetecting portion or a light-attenuating portion 55 is formed on a portion of the knife edge or light-shielding plate 53 which has the recording beam spot in the in-focus state. A photodetector 54 of the supplementary detector 27 for detecting the guide laser beam is arranged on a portion of the knife edge or light-shielding plate 53 on which the guide beam spot is formed in the in-focus state. The recording laser beam is shielded or attenuated by the nondetecting portion or light-shielding plate 53. In this case, the guide laser beam is converted by the photodetector 54 to a supplementary information electrical signal representing the track and sector positions.

The photodetector 51 acting as the defocus detector 30, the information detector 28 and the tracking error detector 29 has first, second, third and fourth photodetecting regions 51-1, 51-2, 51-3 and 51-4. The photodetecting regions 51-1 and 51-4 are arranged along the Y direction, and photodetecting regions 51-2 and 51-3 are also arranged along the Y direction. The photodetecting regions 51-1 and 51-2 are arranged along the X direction and the photodetecting regions 51-3 and 51-4 are also arranged along the X direction. The four rectangular photodetecting regions 51-1, 51-2, 51-3 and 51-4 are formed such that the main light ray R of the reproduction laser beam 17 passes through the intersection of these regions. In the photodetector 51, first, second, third and fourth detection signals having levels L1, L2, L3 and L4 are generated from the photodetecting regions 51-1, 51-2, 51-3 and 51-4, respectively.

The reproduction signal is obtained by adding the first, second, third and fourth detection signals having the levels L1, L2, L3 and L4 reproduced from the photodetecting regions 51-1, 51-2, 51-3 and 51-4, thereby obtaining a sum signal (L1+L2+L3+L4) and hence reproducing the information recorded in the recording surface 22 of the optical disk 21.

The defocus detection signal is generated such that the first and second detection signals are added by the adder to obtain a sum, the third and fourth detection signals are added by another adder to obtain a sum, and a difference between these sums is obtained by an operational amplifier. In other words, the defocus signal is generated by a difference signal $\{(L1+L2)-(L3+L4)\}$.

When the objective lens 20 is held in the in-focus state wherein the minimum beam spot corresponding to the beam waist of the laser beam focused by the objective lens 20 is formed on the recording surface 22 of the optical disk 21, the beam waist of the reproduction laser beam 17 formed by the projection lens 52 is located in the vicinity of the knife edge 53, as shown in FIG. 8. As a result, the defocus detection signal $\{(L1+L2)-(L3+L4)\}$ is substantially zero. However, when the objective lens is moved away from the optical disk 21 and is held in the defocused state, the beam waist of the reproduction laser beam is formed by the projection lens 52 between the knife edge 53 and the projection lens 52. As a result, the defocus detection signal $\{(L1+L2)-(L3+L4)\}$ does not become zero but represents a positive value. Conversely, when the objective lens 20 comes closer from the in-focus position to the optical disk 21 in the defocused state, the beam waist of the reproduction laser beam 17 is formed by the projection lens 52 between the knife edge 53 and the photodetector 51. As a result, the defocus detection signal $\{(L1+L2)-(L3+L4)\}$ does not become zero but represents a negative value. When this defocus detection signal is supplied to the objective lens driver unit 32, the objective lens 20 is always maintained in the in-focus state.

The tracking error signal is obtained such that the first and fourth detection signals are added by an adder, the second and third detection signals are added by an adder, and a difference between the sums from these adders is amplified by an operational amplifier. In other words, the tracking error signal is produced as a difference signal $\{(L1+L4)-(L2+L3)\}$.

When the laser beam properly traces the tracking guide, the objective lens 20 is operated such that a diffraction pattern of the tracking guide 23 is formed on a light-receiving surface of the photodetector 51 in a symmetrical manner about an axis of the photodetector 51 parallel to the Y-axis. Therefore, the tracking error signal $\{(L130\ L4)-(L2+L3)\}$ is substantially zero. However, when the laser beam does not properly trace the tracking guide, the diffraction pattern of the tracking guide 23 is formed on the light-receiving surface of the photodetector 51 in an asymmetrical manner about the axis of the photodetector 51 parallel to the Y-axis. Then, the tracking error signal $\{(L1+L4)-(L2+L3)\}$ does not become zero but represents a negative or positive value. This tracking error signal is supplied to the objective lens driver unit 32, the objective lens 20 is oriented such that the laser beam therefrom properly traces the tracking guide.

Figure 9:
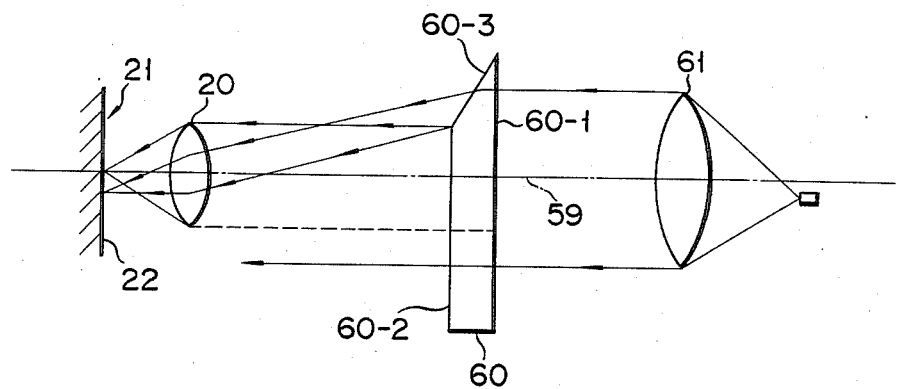
FIGS. 9 and 10 are schematic views showing an optical arrangement of a prism splitting section for splitting a single laser beam into multiple laser beams.

Now, the optical system of the beam splitting section 35 will be described. The optical system of the beam splitting section 35 shown in FIG. 6 is shown in a simplified form as an optical arrangement as shown in FIG. 9. As shown in FIG. 9, the prism 60 for splitting a single laser beam into two laser beams has a light incidence surface 60-1 perpendicular to the optical axis 59, a first light emerging surface 60-2 parallel to the light incidence surface 60-1, and a second light emerging surface 60-3 which is not parallel to the light emerging surface 60-1. The laser beam that has been emitted from the semiconductor laser unit 11 and collimated by the collimator lens 61 to have a diameter greater than the diameter of the objective lens 20 is incident on the light incidence surface 60-1 and emerges from the light emerging surfaces 60-2 and 60-3. In this case, the light beam component emerging from the first light emerging surface 60-2, e.g., reproduction light beam, proceeds straight, i.e., without refraction, toward the objective lens 20, but the light beam component emerging from the second light emerging surface 60-2, e.g., guide light beam, is refracted by the second light emerging surface 60-2 to proceed in a direction different from that of the light beam component emerging from the first light emerging surface 60-1. Thus, two collimated light beams are incident on the objective lens 20 in different directions, so that converged light beam spots are formed at a very small interval on the tracking guide on the light reflecting layer 21. With the optical arrangement shown in FIG. 9, a virtual image of the light spot of the laser unit 11 is formed in addition to the actual image of the light spot of the layer unit 11 as the objective point by the prism 60. That is, the actual and virtual images are formed by the collimator lens 61 and objective lens 20.

Figure 10:
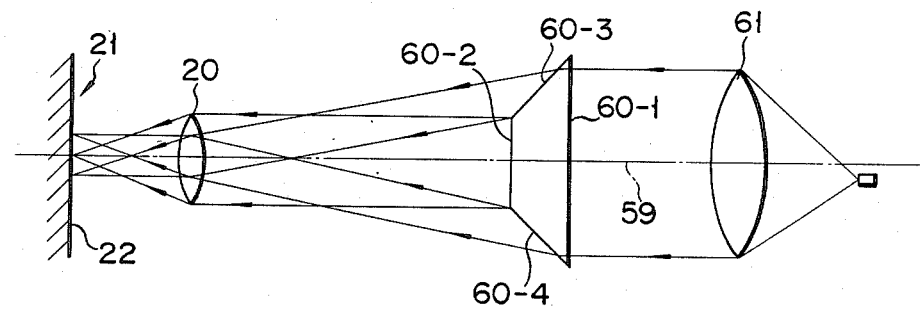

As has been made obvious, the optical system for separating a single light beam into three light beams, may comprise a prism 60, as shown in FIG. 10, having a light incidence surface 60-1, a first light emerging surface parallel to the light incidence surface 60-2 and second and third light emerging surfaces 60-3 and 60-4 which are not parallel to the light incidence surface 60-1. Thus, while the light beam component emerging from the first light emerging surface 60-1 proceeds straight toward the objective lens 20, the light beam components emerging from the second and third light emerging surfaces 60-3 and 60-4 are refracted by the second and third light emerging surfaces 60-3 and 60-4 to proceed toward the objective lens 20 in directions different from that of the light beam component emerging from the first light emerging surface 60-1, whereby a converged light beam spot is formed on the light reflecting surface 21. The optical system for the beam splitting section 35 is not limited to those shown in FIGS. 9 and 10 which utilized refraction of light, but it also possible to adopt an optical system utilizing a reflecting element as shown in FIGS. 11 to 15.

Figure 11:
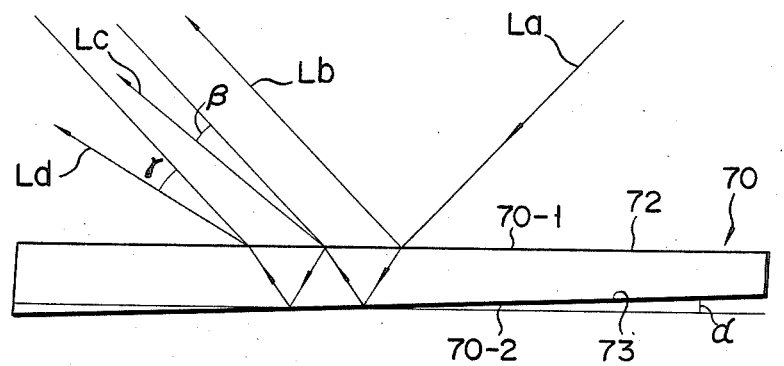
FIG. 11 is a schematic sectional view showing a reflecting element used for a prism splitting section for splitting a single laser beam into multiple beams.
Figure 12:
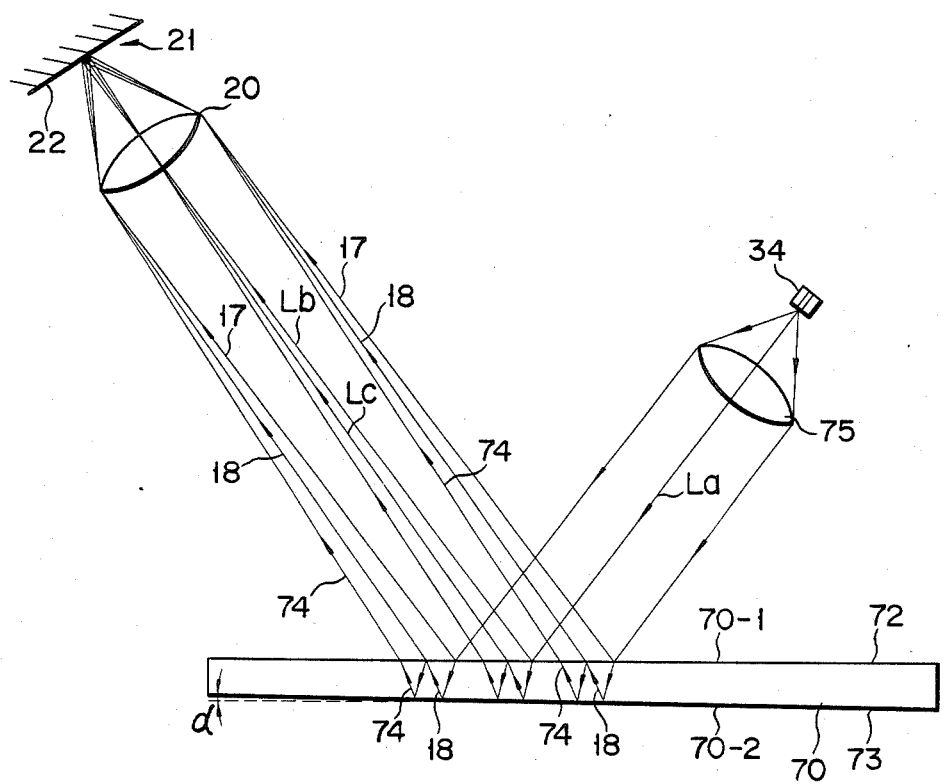
FIG. 12 is a schematic view showing an optical arrangement of a prism splitting section for splitting a single laser beam into multiple beams.

The optical system shown in FIG. 12 utilizes a reflecting element 70 as shown in FIG. 11. The reflecting element 70 is a glass plate having a wedgelike sectional profile. More specifically, it has upper and lower surfaces 72 and 73, which are not parallel to each other and optically flat, the lower surface inclined by an angle $\alpha$ with respect to the upper surface. The upper and lower surfaces 72 and 73 are provided with respective coating layers 70-1 and 70-2 having suitable light reflectivity and light transmittivity corresponding to the light intensity ratio of the light beams to be obtained as a result of the splitting of a single laser beam. For example, the coating layer 70-1 provided on the upper surface 72 has a light reflectivity of 38% and a light transmittivity of 62%, and the coating layer 70-2 provided on the lower surface 73 has a light reflectivity of 100% and a light transmittivity of 0%. As shown in FIG. 12, when a single laser beam La is incident on the upper surface 72 of the reflecting element 72, laser rays with 38% of the light intensity of the laser beam La are reflected as 0-th order reflected laser beam Lb from the upper surface 72 toward the objective lens 20. Laser rays with 62% of the incident single laser beam La are introduced into the reflecting element 70 to be 100% reflected by the lower surface 73 toward the upper surface 72. Part of the laser rays proceeding toward the upper surface 72 of the reflecting element 70 emerges from the upper surface 72 to be directed as 1-st order reflected laser beam Lc toward the objective lens 20. The 1-st order laser beam Lc has 38% (i.e., 62% by 62%) of the light intensity of the incident single laser beam La. The 1-st order laser beam Lc is directed from the upper surface 72 at an angle $\beta$ ($\beta=2\alpha$) with respect to the 0-th order laser beam Lb. Light rays which are not directed as the 1-st order reflected laser beam Lc to the outside of the reflecting element 70 but reflected into the element 70, are reflected by the lower surface 73 toward the upper surface 72 again. Some of the light rays are directed through the upper surface 72 of the reflecting element 70 as a 2-nd order reflected laser beam Ld toward the objective lens 20. The 2-nd order laser beam Ld is directed from the outer surface 72 at an angle $\gamma$ ($\gamma=4\alpha$) with respect to the 0-th order reflected laser beam Lb. The 2nd order reflected laser beam Ld has 14.6% (i.e., 62% by 38%, 100% by 62%) of the light intensity of the incident single laser beam La. The 2-nd order reflected laser beam has a negligibly low light intensity, while the 1-st order reflected laser beam and 0-th order reflected laser beam are substantially equal in the light intensity. Therefore the 0-th order laser beam is used as a reflected laser beam, while the 1-st order reflected laser beam is used as the guide laser beam.

In the reflecting element 70 shown in FIG. 11, it is desired that the light reflectivity of the lower surface 73 is reasonably high, desirably above 50%. In addition, the reflecting element 70 is preferably arranged such that its thickness is greater for its area reflecting the 0-th order light rays than its thickness for the area reflecting the 2-nd order light rays. In the arrangement of the reflecting element 70 as shown in FIG. 11, where its thickness is greater for the area reflecting the 0-th order light rays than the thickness for the area reflecting the 1-st order light rays, the 0-th order light rays, 1-st order light rays and 2-nd order light rays are directed in different directions such that they do not cross and cannot be incident on the objective lens 20. In contrast, with the arrangement of FIG. 12 the 0-th order light rays, 1-st order light rays and 2-nd order light rays are directed in mutually crossing directions, so that these light rays can be incident on the objective lens 20.

The reflecting element 70 shown in FIGS. 11 and 12 will now be analyzed. The light reflectivity of the coating layer 72-1 provided on the surface 72, on which the incident light beam La is incident, is denoted by R, the light transmittivity of the coating layer is denoted by (1−R), and the light reflectivity of the coating layer 72-2 provided on the lower surface 73, on which the incident light beam La is reflected in the reflecting element 70, by r.

Assuming the light intensity of the incident light beam La to be unity, the amount of light of the 0-th order reflected light beam Lb which is reflected solely by the upper surface 72 is R, and the amount of light of the 1-st order reflected light beam Lc which is reflected only once by the lower surface 73 is (1−R) r. Thus, either the 0-th order reflected light beam Lb or 1-st order reflected light beam Lc is used as a reproduction laser beam 17 while the other one of these reflected light beams is used as a guide laser beam 18, and the 2-nd and following order reflected light beams which are reflected at least twice by the lower surface 73 are ignored. The efficiency E of light of the reproduction laser beam 17 and guide laser beam 18 is given as the ratio light intensity of the incident laser beam La to the sum of the light intensity of the 0-th order reflected laser beam and light intensity of the 1-st order reflected laser beam. That is, $$E = R + r(1 - R)^2 \quad (1)$$
$$= r\{R - (1 - \tfrac{1}{2}r)\}^2 + (1 - \tfrac{1}{4}r)$$

In this case, more than one-half of the light intensity of the incident laser beam La is desirably used for the reproduction laser beam 17 and guide laser beam 18, so that the efficiency E is desirably above 50%. The condition for $E \geq \tfrac{1}{2}$ irrespective of the value of the light reflectivity R should be, from equation 1, $$1 - \tfrac{1}{4}r \geq \tfrac{1}{2} \quad (2)$$

By solving the equation 2 for r, we have $$r \geq \tfrac{1}{2}$$

In other words, in order for the efficiency E to be 50%, it is required that the relation $r \geq \tfrac{1}{2}$ holds for the light reflectivity r of the coating layer 70-2 provided on the lower surface 73, at which the incident laser beam La is reflected in the reflecting element 70.

Now, the light reflectivity of the flat upper surface 72 when the light intensity of the 0-th order reflected laser beam Lb and that of the 1-st order reflected laser beam are equal is obtained. In this case, R is given as a solution of $$R = r(1-R)^2 \quad (3)$$

By solving the equation 3 for R, we have $$R = 1 + (1 \pm \sqrt{4r + 1})/2r$$

Since $0 \leq R \leq 1$, we have $$R = 1 + (1 - \sqrt{4r + 1})/2r \quad (4)$$
$$= (1 - 1/2r) + (2 - \sqrt{4r + 1}/2r$$

From the equation 1, the efficiency E is minimum when and only when $$R = 1 - \tfrac{1}{2}r$$

A method of adjusting the light intensity ratio between the two reflected laser beams Lb and Lc without greatly spoiling the efficiency E will now be discussed.

When $r \leq \tfrac{3}{4}$, $2 - \sqrt{4r+1} \geq 0$. Thus, if the light reflectivity R of the optically flat upper surface 72 meets a condition $R \geq 1 - \tfrac{1}{2}r$, particularly $R \geq (1 - \tfrac{1}{2}r) + (2 - \sqrt{4r+1})/2r$, the efficiency E will not take the minimum value even by varying the light amount ratio between the two reflected laser beams. When $r > 4/3$, $2 - \sqrt{4r+1} < 0$. Thus, R and r are determined in a range of $R \leq (1 - \tfrac{1}{2}r) + (2 - \sqrt{4r})/2r$ in the case when the light intensities of the two reflected laser beams are similar to each other. When the light intensities of the two reflected laser beams Lb and Lc are greatly different, R and r are determined in a range of $R \geq (1 - \tfrac{1}{2}r) - (2 - \sqrt{4r+1})/2r$, but the efficiency E does not become minimum. The light intensity $r(1-R)^2$ of the 1-st order reflected laser beam Lc will now be considered. Where R is sufficiently small, a slight change in R greatly changes the light amount $r(1-R)^2$. Where R is close to unity, the light amount $r(1-R)^2$ is not substantially changed even with a great change in R. As is apparent from equation 1, the efficiency E of the light of the reproduction laser beam 17 and guide laser beam 18 greatly depends on the light reflectivity of the flat lower surface 73. A reflecting element 70, which utilizes the total reflection instead of coating a multi-layer coating on the flat lower surface 73 in order to increase the light reflectivity r, can be inexpensively obtained and provide nearly 100% of the light reflectivity.

Figure 13:
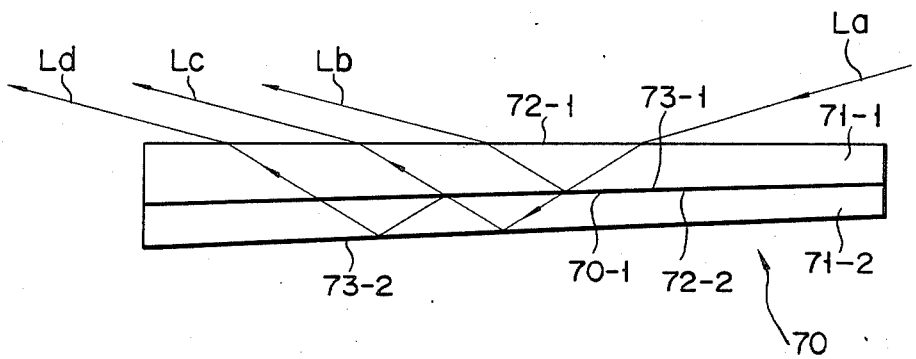
FIG. 13 is a schematic sectional view showing a different reflecting element used for a prism splitting section for splitting a single laser beam into multiple laser beams.

A reflecting element 70 shown in FIG. 13 consists of first and second glass plates 71-1 and 71-2. The first glass plate 71-1 has a comparatively large reflective index n1 and has a wedge-like sectional profile. It has non-parallel, optically flat upper and lower surfaces 72-1 and 73-1, the lower surface being inclined by an angle with respect to the upper surface. The lower surface 73-1 is provided with a coating layer 70-1 having suitable light reflectivity and light transmittivity corresponding to the light intensity ratio of light beams to be obtained through the splitting of a single laser beam. The second glass plate 71-2 has a refractive index n2 smaller than the refractive index n1 of the first glass plate 71-1 and has parallel and optically flat upper and lower surfaces 72-2 and 73-2. The upper surface 72-2 of the second glass plate 71-2 is bonded by an adhesive to the lower surface 73-1 of the first glass plate 71-2 via the coating layer 70-1. In this reflecting element 70 shown in FIG. 13, when a single laser beam La is introduced into the first glass plate 71-1 through the upper surface 72-1 thereof to be incident on the lower surface 73-1 thereof, the laser rays of the laser beam La are partly reflected by the lower surface 73-2 as a 0-th order laser beam Lb to be directed through the upper surface 72-1 of the first glass plate 71-1 toward the objective lens 20. The rest of the incident single laser beam La proceeds into the second glass plate 71-2 through the lower surface 73-1 of the first glass plate 71-1, coating layer and upper surface 72-2 of the second glass plate 71-2 to be incident on 73-2 of the second glass plate 71-2 at an incidence angle greater than the total reflection angle. The rest of the incidence single laser beam La is totally reflected by the lower surface 73-2 of the second glass plate 71-2. The laser rays of the reflected laser beam partly proceed into the first glass plate 71-1 through the lower surface 73-1 of the first glass plate 71-1, coating layer 70-1 and upper surface 72-2 of the second glass plate 71-2 to be directed through the upper surface 72-1 of the first glass plate 71-1 as 1-st order reflected laser beam Lc toward the objective lens 20. The remaining laser rays of the incident single laser beam La totally reflected by the lower surface 73-2 of the second glass plate 71-2 are reflected again by the coating layer to proceed into the second glass plate 71-2, then totally reflected by the lower surface 73-2 of the second glass plate 71-2 and pass through the second glass plate 71-2 and first glass plate 71-1 to be directed as 2-nd order reflected laser beam Lc toward the objective lens 20.

Figure 14:
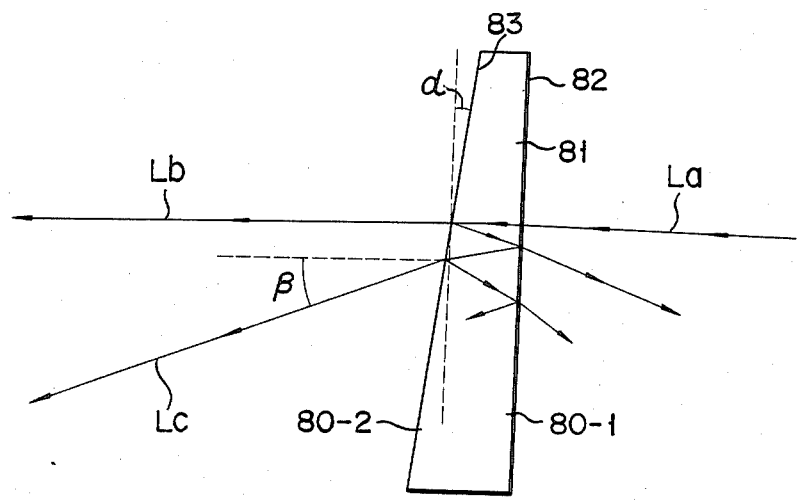
FIG. 14 is a schematic sectional view showing a transmitting element used for a prism splitting section for splitting a single laser beam into multiple beams.
Figure 15:
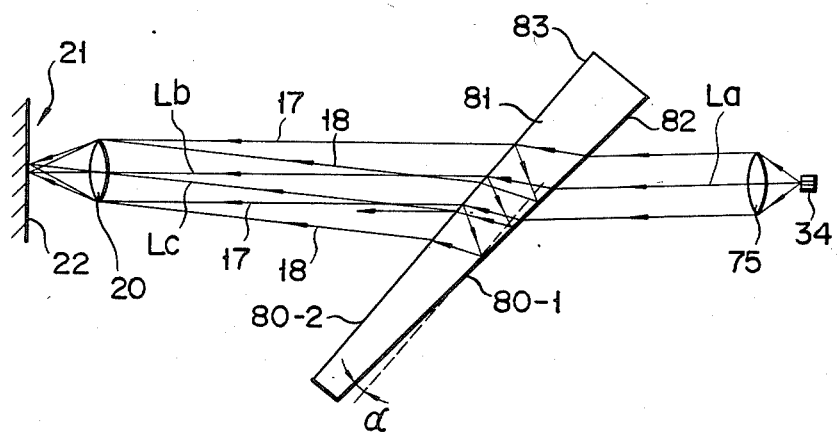
FIG. 15 is a schematic view showing an optical arrangement of a beam splitting section for splitting a single laser beam into multiple beams which incorporates a transmitting element shown in FIG. 14.

In the reflecting elements 70 shown in FIGS. 11 to 13 the single laser beam is split into multiple beams through reflection. However, a laser beam may be split into multiple beams through transmission through a reflecting element 80 as shown in FIGS. 14 and 15. As shown in FIG. 14, the reflecting element 80, like the reflecting element 70 shown in FIG. 11, consists of a glass plate having a wedge-like sectional profile and has parallel and optically flat upper and lower surfaces 82 and 83, the lower surface being inclined with an angle α with respect to the upper surface. The upper and lower surfaces 82 and 83 are provided with coating layers 80-1 and 80-2 having suitable light reflectivity and light transmittivity corresponding to the light intensity ratio of light beams to be obtained from a single laser beam. As shown in FIG. 15, when a single laser beam La is incident on the upper surface 72 of the reflecting element 80, its laser rays partly proceed as a 0-th order laser beam Lb through the reflecting element 80 to be directed from the lower surface 83 thereof toward the objective lens 20. Part of the incident single laser beam La is reflected by the lower surface 83 toward the upper surface 82 to be reflected by the upper surface 82 toward the lower surface 83 again. This laser beam partly passes through the lower surface 83 to be directed as a 1-st order laser beam Lc from the reflecting element 80 toward the objective lens 20. The remaining light rays are reflected by the lower surface 83 toward the upper surface 82 to be reflected by the upper surface 82 toward the lower surface 83. Likewise, the laser beam incident on the lower surface 83 partly passes through the surface 83 to be directed as a 2-nd order laser beam Lb from the reflecting element 80 toward the objective lens 20.

In the reflecting elements shown in FIGS. 11, 12 and 13, the coating layers 70-1 and 70-2 are provided as half mirrors. Where the semiconductor laser as the light source 34 is a multi-mode semiconductor laser for generating a laser beam over a comparatively wide wavelength range, dichronic layers may be provided instead of the coating layers on the upper and lower surfaces 72 and 73, which dichroic layers have suitable light reflectivity and light transmittivity and selectively reflect light rays of a predetermined wavelength. With the reflecting element provided with the dichroic layers, light rays of a predetermined wavelength are selectively reflected by the upper and lower surfaces 72 and 73 toward the objective lens 20.

As has been described in the foregoing, according to the invention it is possible to obtain an optical system, which can produce a plurality of light beams to be incident on an information recording medium with incidence angles slightly different from one another. Further, with the optical system according to the invention the following advantages can be obtained.

(1) 1-st order reflected light beam Lc, 2-nd order reflected light beam Ld, etc., are produced at slight angles with respect to 0-th order reflected laser beam Lb. Therefore, optical means for removing higher order reflected light beams may have a very simple construction.

(2) It is possible to set a large ratio of the sum of the intensities of the 0-th and 1-st order reflected light beams Lb and Lc to the intensity of the total incident light beam (i.e., the efficiency).

(3) It is possible to greatly reduce the disturbance of the wave front of plurality of laser beams obtained from a single laser beam.

(4) It is possible to set a desired light intensity ratio between the 0-th and 1-st order reflected light beams Lb and Lc.

(5) The construction as a multiple laser beam generating apparatus is very simple, so that the apparatus can be manufactured consistently and at a low cost with mass production.

(6) It is possible to vary the angles of the 0-th and 1-st order reflected light beams Lb and Lc readily as so desired.

What is claimed is:

1. Optical apparatus for directing light beams onto an information recording medium, comprising:

a light source means having a first light beam emitting point, for emitting a single light beam;

optical means having a flat light incident surface and first and second light emerging surfaces which are opposite to the light incident surface, said first light emerging surface being substantially parallel to said light incident surface, said second light emerging surface being substantially non-parallel to said light incident surface, said single light beam from the emitting point being transmitted through said light incident surface to said first and second light emerging surfaces to cause said single light beam to be separated into first and second light beam segments at the light emerging surfaces, said first and second light beam segments emerging from the light emerging surfaces being directed in different directions;

objective lens means for converging said first and second light beam segments onto the information recording medium, and for transferring first and second reflected light beam segments from the information recording medium; and means for retrieving information from at least one of the reflected light beam segments transferred from said objective lens.

2. Optical apparatus according to claim 1, further comprising means for collimating the single light beam from the light emitting point, and for transferring the collimated light beam to said optical means.

3. Optical apparatus according to claim 1, wherein said optical means includes a third light emerging surface which is substantially non-parallel to said light incident surface, the single light beam transmitted through said light incident surface being separated into said first and second light beam segments and a third light beam segment at the light emerging surfaces, and wherein said first, second and third light beam segments are converged by said objective lens means.

4. Optical apparatus according to claim 1, wherein said means for retrieving includes:

means for detecting one of said first and second reflected light beam segments, and for generating a first electric signal corresponding thereto; and means for processing said first electric signal to generate an information signal corresponding to information recorded on the information recording medium.

5. Optical apparatus according to claim 4, wherein said detecting means includes means for picking up said one of said first and second reflected light beam segments.

6. Optical apparatus according to claim 4, wherein said detecting means includes means for generating a second electric signal corresponding to said one of said first and second reflected light beam segments, and wherein said processing means includes means for processing said second electric signal to generate a focusing-error signal.

7. Optical apparatus according to claim 6, further comprising means for suspending said objective lens means, and for shifting said objective lens means along its optical axis in response to said focusing-error signal.

8. Optical apparatus for directing light beams onto an information recording medium, comprising:

a light source means having a first light beam emitting point, for emitting a single light beam;

first optical means having first and second flat surfaces which are opposed and non-parallel to each other;

first optical layer means formed on said first surface for allowing a first segment of said single light beam to pass therethrough, and for causing a second segment of said single light beam to be reflected therefrom in a first direction, said first light beam segment passing through both said first layer means and said first surface but being reflected from said second surface, said second light beam segment being transmitted through both said first layer means and said first surface and directed outside of said optical means in a second direction which is different from the first direction;

objective lens means for converging the said first and second light beam segments from said optical means onto said information recording medium, and for transferring first and second reflected light beam segments from said information recording medium; and means for retrieving information from at least one of said reflected light beam segments transferred from said objective lens means.

9. Optical apparatus according to claim 8, further comprising means for collimating said single light beam from said light emitting point, and for transferring the collimated light beam to said optical means.

10. Optical apparatus according to claim 8, further comprising second optical layer means formed on said second surface, for causing said first light beam segment passing through both said first layer means and said first surface to be reflected therefrom, said second reflected light beam segment being transferred through both said first layer and said first surface.

11. Optical apparatus according to claim 8, further comprising:

second optical means having third and fourth flat surfaces which are opposed and non-parallel to each other, said fourth surface being in contact with said first layer means, said single light beam being transferred through said second optical means to said first optical means, and said first and second light beam segments being transmitted through said second optical means.

12. Optical apparatus according to claim 11, wherein a part of said second light beam segment reflected from said second surface passes through said first layer, and wherein another part of said second light beam segment reflected from said second surface is reflected from said first and second surfaces of said first optical means and passes through said first surface, said first layer means and said second optical means and is directed outside of said first and second optical means.

13. Optical apparatus according to claim 8, wherein said means for retrieving includes:

means for detecting one of the first and second reflected light beam segments, and for generating a first electrical signal; and means for processing said first electric signal, and for generating an information signal corresponding to information recorded on said information recording medium.

14. Optical apparatus according to claim 13, wherein said detecting means includes mean for picking up said one of said first and second reflected light beam segments.

15. Optical apparatus according to claim 13, wherein said detecting means includes means for generating a second electric signal corresponding to said one of said first and second reflected light beam segments, and wherein said processing means includes means for processing said electric signal to generate a focusing-error signal.

16. Optical apparatus according to claim 15, further comprising means for suspending said objective lens means, and for shifting said objective lens means along its optical axis in response to said focusing-error signal.

17. Optical apparatus for directing light beams onto an information recording medium, comprising:
  light source means having first light beam emitting point, for emitting a single light beam;
  first optical means having first and second flat surfaces which are opposed and non-parallel to each other;
  first optical layer means formed on said first surface, for allowing a first segment of said single light beam, emitted from said light emitting point and transmitted through said second surface of to pass therethrough in a first direction, and for causing a second segment of said single light beam to be reflected therefrom, said second light beam segment reflected from said first layer means being reflected from said second surface and then transmitted through both said first layer means and said first surface and directed outside of said first optical means in a second direction which is different from said first direction;
  objective lens means for converging said first and second light beam segments from said first optical means onto said information recording medium, and for transferring first and second information light beam segments reflected from said information recording medium; and
  means for retrieving information from at least one of said first and second information light beam segments transferred from said objective lens means.

18. Optical apparatus according to claim 17, further comprising mean for collimating said single light beam and for transferring said collimated light beam to said first optical means.

19. Optical apparatus according to claim 17, further comprising second optical layer means formed on said second surface, for causing said second light beam segment reflected from said first layer to be reflected therefrom, said second reflected light beam segment being transmitted through both said first layer and said first surface.

20. Optical apparatus according to claim 17, wherein said means for retrieving includes:
  means for detecting one of said first and second information light beam segments, and for generating a first electric signal corresponding to said one of said first and second information light beam segments; and
  means for processing said first electric signal, and for generating an information signal corresponding to information recorded on said information recording medium.

21. Optical apparatus according to claim 20, wherein said detecting means includes means for picking up said one of said first and second information light beam segments.

22. Optical apparatus according to claim 20, wherein said detecting means includes means for generating a second electric signal corresponding to one of said first and second information light beam segments, and wherein said processing means includes means for processing said second electric signal to generate a focusing-error signal.

23. Optical apparatus according to claim 22, further comprising means for suspending said objective lens means, and for shifting said objective lens along its optical axis in response to said focusing-error signal.

* * * * *